UNITED STATES PATENT OFFICE.

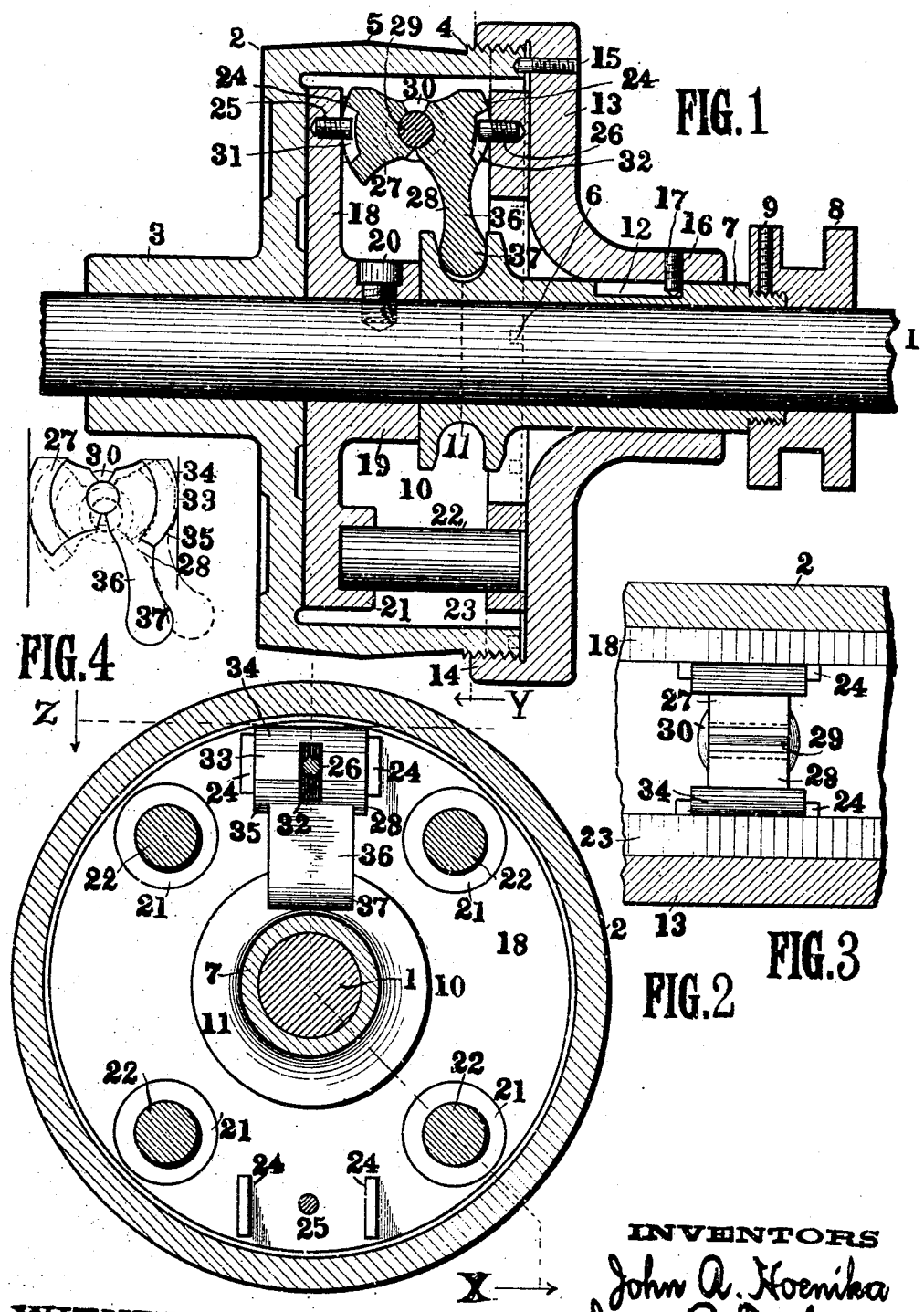

JOHN ADAM HOENIKA, AND JESSE ROBERT TRIPLETT, OF AKRON, OHIO.

FRICTION-CLUTCH.

No. 898,362.        Specification of Letters Patent.        Patented Sept. 8, 1908.

Application filed May 25, 1908. Serial No. 434,953.

*To all whom it may concern:*

Be it known that we, JOHN ADAM HOENIKA and JESSE ROBERT TRIPLETT, citizens of the United States, residing at Akron, in the county of Summit and State of Ohio, have invented new and useful Improvements in Friction-Clutches, of which the following is a specification.

This invention relates to friction clutches and the object thereof is to provide a clutch which will be strong, durable, efficient and easy to manufacture, possessed of great power-transmitting qualities and in which the operation of the clutch produces no end thrust on the shaft.

A further object of this invention is to construct a device of the class designated in which the working parts will be completely inclosed in an approximately fluid and dust-tight casing containing an oil bath for effecting perfect lubrication of the parts as well as to prevent the entrance of dust and foreign matters thereto.

With the foregoing and other objects in view, the invention consists in the novel construction, combintion and arrangement of parts hereinafter specifically described and illustrated in the accompanying drawings which form a part of this specification wherein is shown a preferred embodiment of the invention, but it is to be understood that changes, variations and modifications can be resorted to which come within the scope of the claims hereunto appended.
Referring to the drawings, Figure 1 is a view in vertical, central, longitudinal section of a friction clutch embodying our invention on line X of Fig. 2. Fig. 2 is a transverse sectional view on line Y of Fig. 1.
Fig. 3 is a sectional view through a complete clutch in a plane indicated by the line Z of Fig. 2, and, Fig. 4 is a view, mainly diagrammatic, of the clutch-operating mechanism.
Referring to the drawings in detail, 1 is a suitably-supported rotatable shaft, loosely-mounted on which is a cup-shaped member 2 having a hub 3 and provided with an exteriorly-threaded portion 4 adjacent its open end. The outer face 5 of the member 2 is shown crowned, to receive a belt for transmitting motion to and from the clutch, but this portion may be formed with sprocket or gear teeth for the same purpose without departing from the scope of this invention. In the front edge of the cup-shaped portion of the member 2 is a series of shallow recesses 6, for a purpose to be later described.

Shiftably-mounted on the shaft 1 is a sleeve 7 preferably having its outer end threaded to receive a grooved hub 8 held in place thereon by means of a set screw 9. The inner end of the sleeve 7 is provided with an enlarged head 10 in which is a circumferential groove 11. This sleeve is also provided with a key-way 12, for a purpose to be later described.

The open end of the member 2 is arranged to be closed by means of a cap 13 provided with a lateral interiorly-threaded flange 14 to engage and coöperate with the threads 4 of the member 2 and form therewith an approximately fluid and dust-proof joint and when in proper relation with the member 2 the cap 13 is locked against independent revolution by means of a set screw 15 carried by the member 13 adapted to enter one of the series of recesses 6. The cap 13 is provided with a hub 16 mounted on the sleeve 7 and is provided with a set screw 17 arranged to enter the key-way 12 for locking the cap 13 and sleeve 7 together in order to insure their revolution in unison.

The fixed member of the clutch comprises a friction plate 18, mounted on the shaft 1, within the member 2 and provided with a hub 19, which carries a set screw 20 for fixedly uniting it to the shaft 1. The plate 18 is also provided with a plurality of laterally-extending lugs 21 each provided with a recess in which are fixedly mounted parallel, laterally-extending guide-pins 22. Shiftably mounted on the outer ends of the pins 22 is a perforated annularly-formed friction plate 23 adapted to slide on the pins 22 toward and away from the plate 18 and adapted to revolve in unison therewith. The plates 18 and 23 are each provided with oppositely-disposed, parallel pairs of lugs 24, the pairs of lugs of each plate being arranged between the lugs 21, as shown in Fig. 2. Mounted centrally between the members of each pair of lugs 24 on the plate 18 is a laterally-extending pin 25 and between the lugs 24 of the plate 23 is a similar pin 26.

The plates 18 and 23 are normally arranged to lie out of contact with the inner faces of the members 2 and 13 in order that the revolution of either of the plates 18 or 23, or the members 2 and 13 may take place without causing a simultaneous revolution of the other, and in order to effect clutching relation between the plates 18 and 23 with the members 2 and 13 suitable mechanism is employed for forcing the members 18 and 23 apart in order to cause them to frictionally engage the inner faces of the members 2 and 13.

In the drawings, only one set of the mechanisms employed for forcing the plates 18 and 23 apart and into frictional engagement with the members 2 and 13 is shown, but it will be obvious that any desired number may be employed and as these sets of mechanism are all alike, a description of the one is believed to be sufficient for a complete understanding of all of them.

The mechanism employed for effecting clutching relation between the members, comprises two members 27 and 28 oppositely-disposed to one another and having partially cylindrically-formed grooves in their opposing faces. Mounted in these cylindrical grooves is a bolt 29 provided with flanged heads 30. The outer portion of the member 27 is adapted to engage the plate 18 between the lugs 24 and is formed with upper and lower portions concentric with the center of the bolt 29 and with a flat intermediate portion, and is also provided with a shallow recess 31 to receive the projecting end of the pin 25. The member 28 is positioned between the lugs 24 on the plate 23 and is also provided with a recess 32 to receive the extended end of the pin 26. The rear face of this member is provided with a flattened central portion 33 above which is a curvilinearly-formed portion 34 concentric with the center of the bolt 29. Below the flat portion 33 is a curved portion 35 which is eccentric to the center of the bolt 29 and constitutes a cam for forcing the plates 18 and 23 apart when the members 27 and 28 are thrown to the position shown in Fig. 1 and indicated by full lines in Fig. 4, which brings this cam portion into engagement with the plate 23. The member 28 is formed with a depending leg 36 having a rounded end 37 which is adapted to engage in the circumferential groove 11. Both members 27 and 28 are so shaped that the outer portions which bear against the plates 18 and 23, respectively, are enlarged as shown in Fig. 3, in order to provide greater bearing surface for these plates and the central portions which engage the bolt 29 are reduced as shown in this figure.

The operation of the device is as follows:—

Motion communicated either by a belt or otherwise to the member 2 will cause a simultaneous revolution of the parts connected therewith, viz., the cap 13, sleeve 7 and hub 8. If it is desired to transmit this motion to the shaft 1, a clutch lever, not shown but engaging in the groove in the hub 8 is thrown so as to cause a shifting of the hub 8 and sleeve 7 which causes the leg 36 of the member 28 to swing into operative position, as clearly shown in Fig. 1 and indicated in full lines in Fig. 4. This movement of the member 28 brings the cam surface 35 against the plate 23 forcing it into frictional engagement with the cap 13. The pressure of the plate 23 against the cap 13 causes the member 2 to slide on the shaft 1 sufficiently to bring the inner face thereof into frictional engagement with the outer face of the plate 18. When the members 27 and 28 have been thrown into operative position as shown in Fig. 1, the flattened portions on the outer faces thereof are in engagement with the plates 18 and 23 which temporarily locks them against unintentional release until they are moved to inoperative position by the shifting of the sleeve 7. The inoperative position of the members 27 and 28 are shown in dotted lines in Fig. 4 and when in this position the outer faces of these members are withdrawn from engaging relation with the faces of the plates 18 and 23 thereby releasing them from the pressure exerted by these members when in operative relation and causes a discontinuance of the revolution of the plates 18 and 23 in unison with the cup-shaped member 2 and its cap 13.

It will be obvious that any number of pairs or sets of mechanisms, illustrated by the members 27 and 28 may be employed and they may be so disposed with reference to the plates 18 and 23 as will best serve the purpose of this invention, and it will also be obvious that motion may be transmitted from the shaft 1 to the member 2 instead of transmitting motion from the member 2 to the shaft 1. In either case the clutch constitutes means for controlling the communication of power between them.

It will be apparent that the plates 18 and 23 must be so positioned that when the clutch-operating mechanism is thrown into operative position, the members thereof will engage the faces of the plates 18 and 23 with sufficient firmness to cause simultaneous revolution of the cup-shaped member 2 therewith, and as the contacting surfaces of the members of the clutch will become more or less worn by use, experience has demonstrated that it will be occasionally necessary to adjust the position of the cap 13 with reference to the member 2 and this is readily accomplished by removing the set screw 15 and adjusting the cap 13 by revolving it in either direction to bring it to proper position, after which the set screw is again replaced which firmly holds the cap against movement. If it is desired, the number of recesses 6 which are intended to receive the end of the set screw 15 may be increased in order that the position of the cap 13 may be adjusted with the greatest nicety and then securely locked against movement. The joint between the members 2 and 13 should be made sufficiently tight to hold a body of oil placed within the cup-shaped member 2 for the purpose of effecting perfect lubrication of the parts and excluding dust and other foreign or injurious substances therefrom.

What we claim and desire to secure by Letters Patent, is:—

1. A clutch comprising a loose member adapted to be mounted upon a rotatable element, a shiftable member connected with and rotated by said element, a pair of coöperating rocking members provided with curvilinearly-formed outer faces engaging a single movable pivot, one of said rocking members provided with a depending portion oscillatory in a longitudinal direction with respect to the axis of said element and adapted to move said rocking members into engagement with said shiftable member, thereby causing clutching engagement between said shiftable member and said loose member.

2. In a clutch, the combination with a loose member adapted to be mounted upon a rotatable element, a shiftable member connected with and rotated by said element, a pair of rocking members both engaging a single movable pivot, one of said rocking members provided with a cam-shaped periphery and further provided with a depending leg oscillating in a longitudinal direction with respect to the axis of said element disposed at one side of said shiftable member, and means for oscillating said cam-shaped member, causing thereby the moving of said shiftable member to clutching engagement with said loose member.

3. A clutch comprising a loose member adapted to be mounted upon a rotatable element, two fixed members connected with and rotated by said element, one of said fixed members being shiftable with respect to the other, a pair of rocking members provided with curvilinearly-formed outer faces and arranged to engage a single movable pivot, each of said faces adapted to engage one of said fixed members, one of said rocking members provided with a depending leg oscillatory in a longitudinal direction with respect to the axis of said element and means for oscillating said leg, causing thereby the moving of said shiftable member into clutching engagement with said loose member.

4. In a clutch, a loose member adapted to be mounted upon a rotatable element, a shiftable member connected with and rotated by said element, a pair of rocking members both of which are mounted on a movable pivot disposed at one side of and independent of said shiftable member and oscillating in a longitudinal direction with respect to the axis of said element, and means for oscillating one of said rocking members, causing thereby the moving of said shiftable member to clutching engagement with said loose member.

5. In a clutch, a cup-shaped loose member adapted to be mounted upon a rotatable element, a cap adapted to coöperate with and constitute a closure device for the open end of said loose member, a fixed member within said loose member connected with and rotated by said element, a shiftable member carried by said fixed member, a pair of coöperating members mounted on a movable pivot, one of which is provided with an eccentric periphery and a depending leg oscillating in a line parallel to the axis of said element, and means for oscillating said leg for causing clutching engagement between said shiftable member and said loose member.

6. In a clutch, a hollow loose member adapted to be mounted on a rotable element, a shiftable member connected with and rotated by said element positioned within said loose member, a pair of coöperating members both mounted on a movable pivot, one of which is provided with a cam-shaped periphery and further provided with a depending oscillatory leg, said last-named member when oscillated in one direction adapted to move said shiftable member to clutching engagement with said loose member, and means for oscillating said cam-shaped member.

7. In a clutch, a hollow loose member adapted to be mounted on a rotatable element, a friction plate connected with and rotated by said element positioned within said loose member, a shiftable friction plate connected with and rotated by said fixed plate, a pair of coöperating rocking members adapted to be mounted on a movable pivot, one of said rocking members provided with a cam face and oscillatory in a direction parallel to the axis of said element and means for oscillating said rocking member for causing the moving of said shiftable member to clutching engagement with said loose member.

8. In a clutch, a hollow loose member adapted to be mounted upon a rotatable element, a plate fixedly connected with and rotated by said element, guide-pins carried by said plate, a shiftable plate carried by said guide-pins, a pair of rocking members mounted on a movable common pivot and provided with curvilinearly-formed peripheries adapted to engage and coöperate with said plates, one of said rocking members arranged to be oscillated in a direction parallel to the axis of said rotatable element and means for oscillating said rocking member for moving said plates into clutching engagement with said loose member.

9. In a clutch, a hollow loose member adapted to be mounted upon a rotatable element, a plate fixedly connected with and rotated by said element, said plate provided with a pair of parallel laterally-projecting lugs, guide-pins carried by said plate, a shiftable plate carried by said guide-pins, said shiftable plate provided with a pair of laterally-extending parallel lugs oppositely-disposed with respect to the lugs on said fixed plate, a pair of rocking members disposed between said fixed and shiftable plates, each of said rocking members positioned between the members of the pairs of lugs on each of said plates, said rocking members mounted on a movable common pivot and provided with curvilinearly-formed peripheries adapted to engage and coöperate with said plates, one of said rocking members provided with a depending leg oscillating in a line parallel to the axis of said rotatable element and means for oscillating said rocking member for moving said plates into clutching engagement with said loose member.

10. In a clutch, a hollow loose member adapted to be mounted upon a rotatable element, a fixed plate connected with and rotated by said element, a pin projecting from the face of said plate, guide-pins carried by said plate, a shiftable plate carried by said guide-pins, a pin projecting from the face of said shiftable plate, a pair of rocking members disposed between said fixed and shiftable plates each provided with a recess in its outer face to receive one of the pins projecting from said fixed and shiftable plates whereby said members are held in position, one of said rocking members provided with a depending leg oscillating in a direction parallel to the axis of said rotatable element, and means for oscillating said rocking member for moving said plates into clutching engagement with said loose member.

11. In a clutch, a hollow loose member adapted to be mounted upon a rotatable element, a fixed plate connected with and rotated by said element, a pair of laterally projecting parallel lugs on the face of said plate, a pin projecting from the face of said plate between said lugs, guide-pins carried by said plate, a shiftable plate carried by said guide-pins, a pair of parallel lugs projecting laterally from the face of said shiftable plate, a pin projecting from the face of said shiftable plate between said lugs, a pair of rocking members mounted on a single movable pivot disposed between said fixed and shiftable plates and so disposed that said pairs of parallel lugs constitute retaining means therefor, said members provided with curvilinearly-formed peripheries in which are recesses to receive the projecting ends of said pins, said rocking members adapted to engage the inner faces of said plates one of said rocking members provided with an extended leg oscillating in a direction parallel to the axis of said rotatable element, and means for oscillating said last-named member for moving said shiftable member into clutching engagement with said loose member.

12. In a clutch, a hollow loose member adapted to be mounted upon a rotatable element, a plate fixedly connected with and rotated by said element, sustaining means carried by said plate, a shiftable plate on said sustaining means, a pair of rocking members disposed between said fixed and shiftable plates, one of said members provided with a cam-shaped outer face and an extended oscillatory leg, means for oscillating said member whereby the cam-portion of said member is arranged to force said shiftable plate into clutching engagement with said loose member.

13. In a clutch, a hollow loose member adapted to be mounted upon a rotatable element, a plate fixedly connected with and rotated by said element, a shiftable plate connected with and revolved by said fixed plate, a pair of rocking members disposed between said fixed and shiftable plates mounted on a movable common pivot, one of said plates provided with a cam-shaped outer face and a depending oscillatory leg, a shiftable sleeve mounted on said rotatable element, said sleeve provided with means for engaging and oscillating said leg for causing the moving of said shiftable member to clutching engagement with said loose member.

14. In a clutch, a hollow loose member adapted to be mounted upon a rotatable element, a plate fixedly connected with and rotated by said element, a shiftable plate connected with and rotated by said fixed plate, a pair of rocking members mounted on a common pivot disposed between said fixed and shiftable plates, one of said members provided with a depending leg arranged to be oscillated in a direction parallel to the axis of said rotatable element, and a shiftable sleeve on said rotatable element provided with a grooved inner end to receive and move the extended leg of said oscillatory element for causing the movement of said shiftable member to clutching engagement with said loose member.

15. In a clutch, a hollow loose member adapted to be mounted upon a rotatable element, a fixed plate connected with and rotated by said element, a shiftable plate connected with and rotated by said fixed plate, guiding means carried by said fixed plate, a pair of rocking members disposed between said fixed and shiftable plates and engaging said guiding means, said rocking members adapted to be mounted on a single movable pivot, one of said rocking members provided with an extended leg arranged to be oscillated in a direction parallel to the axis of said rotatable element, and means for oscillating said rocking member for moving said shiftable plate into clutching engagement with said loose member.

In testimony whereof we have hereunto set our hands in presence of two subscribing witnesses.

JOHN ADAM HOENIKA.
JESSE ROBERT TRIPLETT.

Witnesses:
C. E. HUMPHREY,
GLENARA FOX.